US012590679B2

(12) United States Patent
Gabrielli et al.

(10) Patent No.: US 12,590,679 B2
(45) Date of Patent: Mar. 31, 2026

(54) SYSTEM FOR CIRCULATING A LIQUID

(71) Applicant: PIUSI S.P.A., Suzzara (IT)

(72) Inventors: Simone Gabrielli, Frazione San Piero In Bagno (IT); Michele Pellizzari, Frazione Campitello (IT)

(73) Assignee: PIUSI S.P.A., Suzzara (IT)

( * ) Notice: Subject to any disclaimer, the term of this patent is extended or adjusted under 35 U.S.C. 154(b) by 43 days.

(21) Appl. No.: 18/402,877

(22) Filed: Jan. 3, 2024

(65) Prior Publication Data

US 2024/0240764 A1 Jul. 18, 2024

(30) Foreign Application Priority Data

Jan. 12, 2023 (IT) ........................ 102023000000267

(51) Int. Cl.
*F17D 3/01* (2006.01)
*B67D 7/66* (2010.01)
*F17D 1/14* (2006.01)

(52) U.S. Cl.
CPC ................. *F17D 3/01* (2013.01); *B67D 7/66* (2013.01); *F17D 1/14* (2013.01)

(58) Field of Classification Search
CPC ..... F17D 3/01; F17D 1/14; F17D 5/00; B67D 7/66; F04B 2201/0801; F04B 2203/0201; F04B 2203/0202; F04B 2203/0204; F04B 17/03; F04B 49/065; F04B 49/20; F04D 15/0077; F04D 15/0088; F04D 13/06; F04D 1/00
See application file for complete search history.

(56) References Cited

U.S. PATENT DOCUMENTS

| | | | | |
|---|---|---|---|---|
| 2004/0064292 | A1 | 4/2004 | Beck et al. | |
| 2005/0031443 | A1 | 2/2005 | Ohlsson et al. | |
| 2008/0095638 | A1 | 4/2008 | Branecky | |
| 2009/0288407 | A1 | 11/2009 | Bartos et al. | |
| 2015/0037169 | A1* | 2/2015 | Veltman | F04D 15/0088 318/400.15 |
| 2016/0265520 | A1* | 9/2016 | Skinner, Jr. | F04B 49/065 |
| 2019/0234398 | A1* | 8/2019 | Endo | F04B 49/20 |
| 2020/0224645 | A1* | 7/2020 | Buckley | F04B 9/045 |
| 2022/0170455 | A1* | 6/2022 | Leleu | F04C 14/28 |

FOREIGN PATENT DOCUMENTS

| | | | |
|---|---|---|---|
| EP | 2828530 | A1 | 1/2015 |
| WO | 2013/141698 | A1 | 9/2013 |

OTHER PUBLICATIONS

Italian Search Report and Written Opinion dated May 8, 2023 issued in IT 202300000267, with partial translation.
European Examination Report dated Apr. 17, 2025 received in European Application No. 23 220 645.8.

* cited by examiner

*Primary Examiner* — Hoang M Nguyen
(74) *Attorney, Agent, or Firm* — Scully, Scott, Murphy & Presser, P.C.

(57) ABSTRACT

A system for circulating a liquid which comprises at least one pump, connectable to at least one pipe for the flow of a liquid and driven by at least one electric motor; sensors being provide for sensing at least two electrical parameters correlated with the operation of the electric motor and a processor which is functionally connected to the sensors and configured to determine, based on the signals provided by the sensors, at least one fluid-dynamic parameter correlated with the flow of the liquid through the pipe.

10 Claims, 7 Drawing Sheets

SYSTEM FOR CIRCULATING A LIQUID

The present invention relates to a system for circulating a liquid.

Systems are known for circulating a liquid, such as, for example, plumbing systems or the like, which comprise at least one pipe, in which a liquid is made to flow, and at least one pump, interposed along the pipe, which enables the liquid to circulate in said pipe.

Usually, conventional plumbing systems are also provided with other elements, also along the pipe, and these elements are typically constituted by one or more measurement sensors, which make it possible to measure at least one fluid-dynamic parameter of the system, such as, for example, the flow rate or the pressure of the liquid, as well as valves for adjusting or blocking the flow of the liquid inside the pipe, actuators, or other devices.

The system can optionally also comprise a control device, typically constituted by an electronic controller, which is capable of exchanging data and commands with various elements of the plumbing system analogically or digitally, in order to intervene in the operation of the plumbing system, based on preset conditions and instructions.

Typically, the control device performs functions to start/stop the system, adjust/view the fluid-dynamic parameters of the system, and manage statuses and alarms, normally based on the signals supplied by the measurement sensors.

Such a structure, although capable of meeting the control requirements of a system, makes it necessary however to have several sensors in suitable positions, in the system, and in particular along the pipe in which the liquid circulates, not always easily reachable, with consequent costs for installation and management of those sensors.

The aim of the present invention is to provide a system for circulating a liquid which is capable of improving the known art in one or more of the above-mentioned aspects.

Within this aim, an object of the invention is to provide a system for circulating a liquid that is capable of obtaining the measurements necessary for its operation without the need to have to install specific flow rate sensors or pressure sensors along the pipe.

Another object of the invention is to provide a system for circulating a liquid that is capable of offering the maximum assurances of reliability and safety in operation.

A further object of the present invention is to overcome the drawbacks of the known art in an alternative manner to any existing solutions.

Another object of the invention is to provide a system for circulating a liquid that is relatively easy to implement and which has production costs that are highly competitive with respect to the known art.

This aim and these and other objects which will become better apparent hereinafter are achieved by a system for circulating a liquid according to claim 1, optionally provided with one or more of the characteristics of the dependent claims.

Further characteristics and advantages of the invention will become more apparent from the description of preferred, but not exclusive, embodiments of the system for circulating a liquid according to the invention, which are illustrated for the purposes of non-limiting example in the accompanying drawings wherein.

Figure 1:
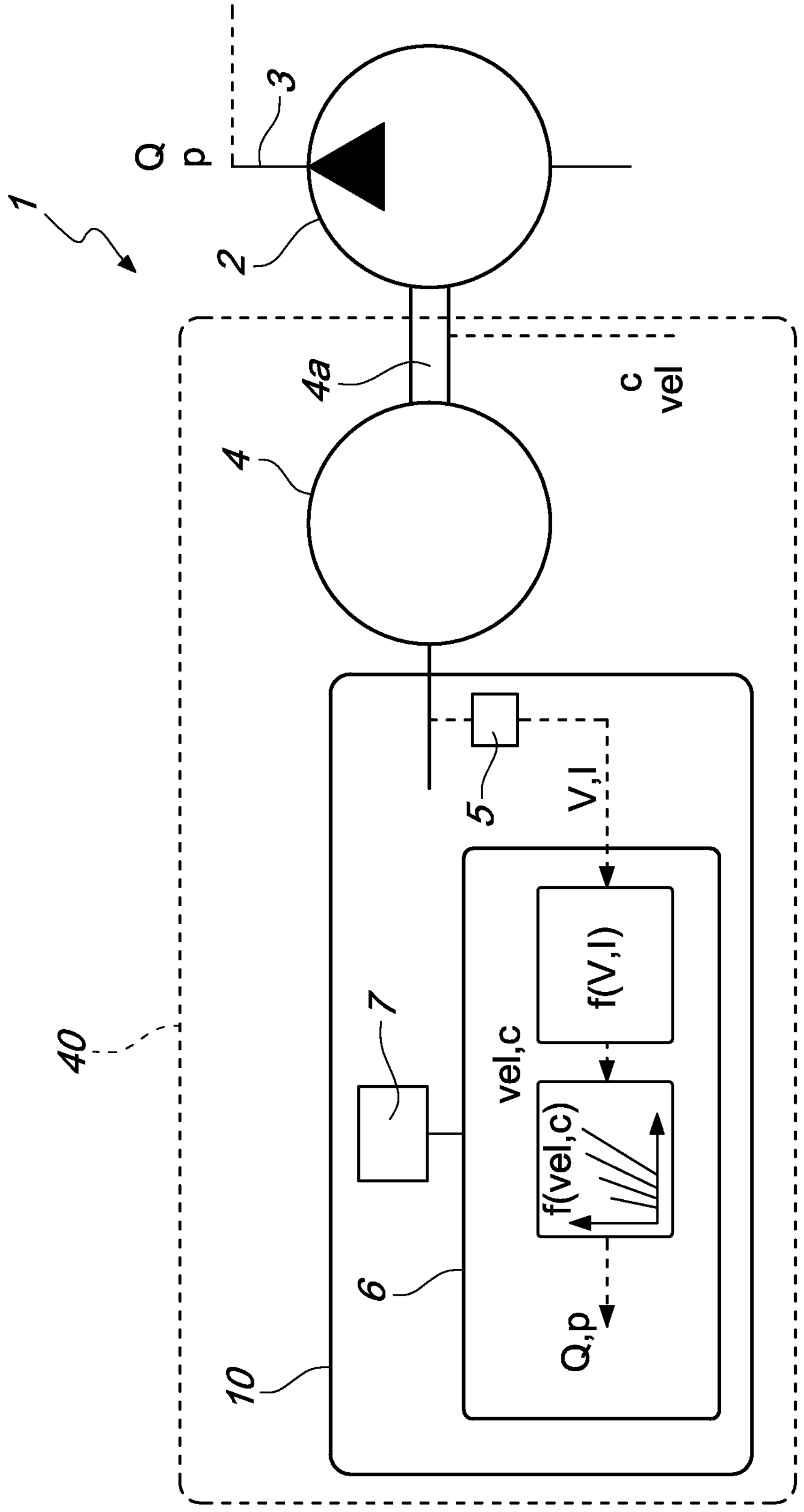
FIG. 1 is a schematic diagram of the system according to the invention with a scheme of its steps of operation.
Figure 2:
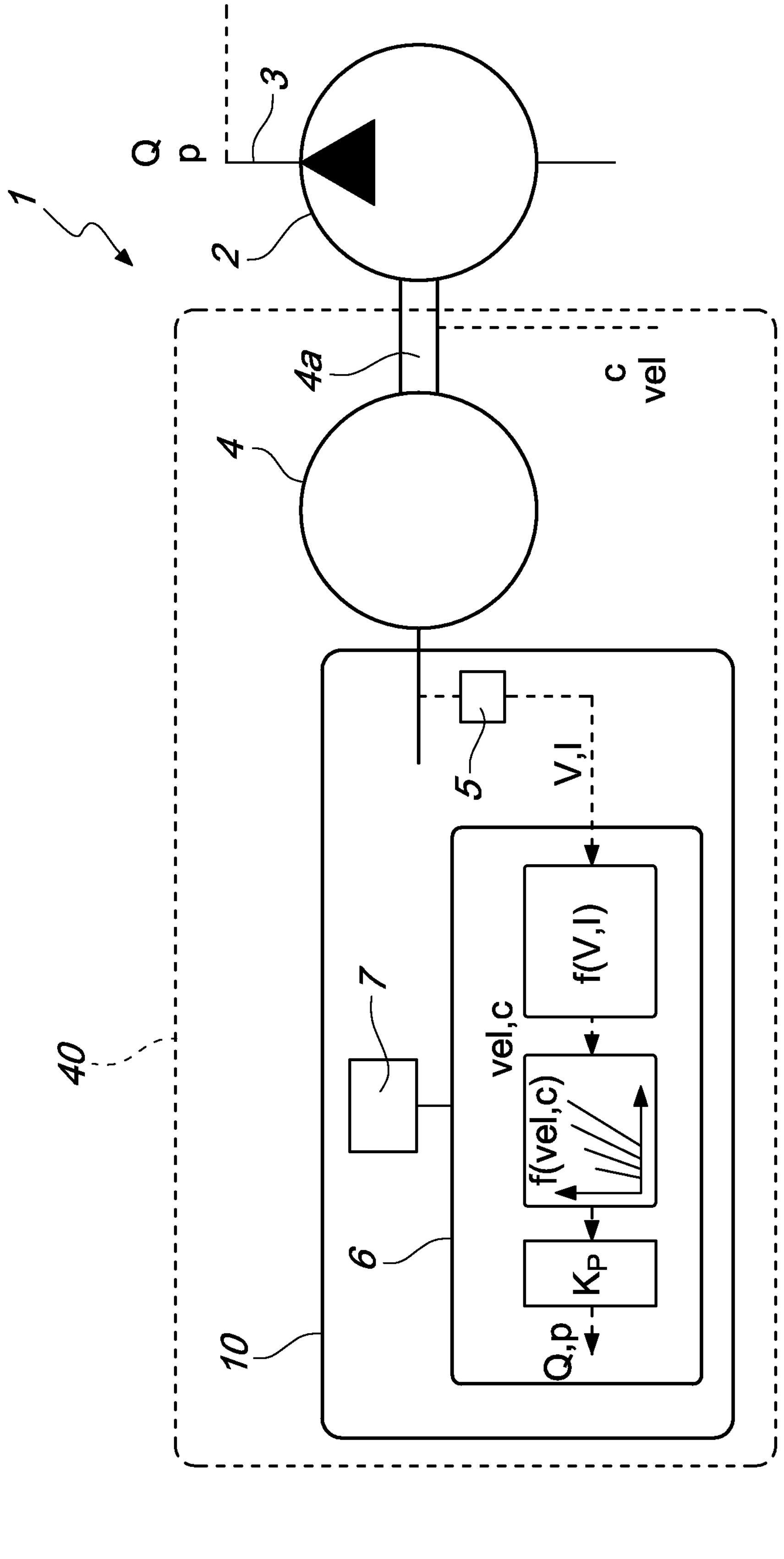
FIG. 2 shows a possible embodiment of the system according to the invention, with a different scheme of its steps of operation.
Figure 3:
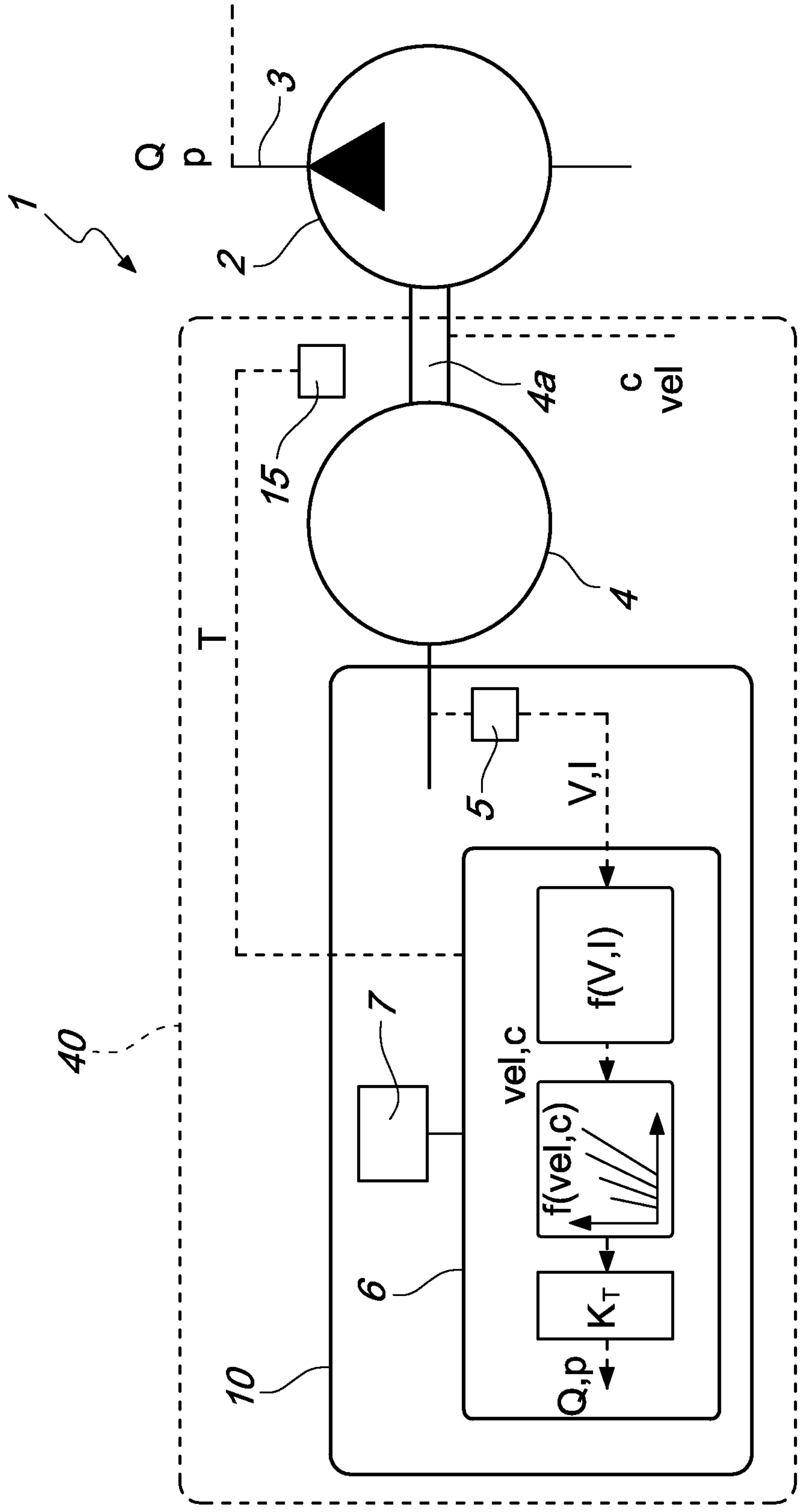
FIG. 3 is a schematic diagram of another embodiment of the system according to the invention, with an additional scheme of its steps of operation.

With reference to the figures, the system for circulating a liquid according to the invention, generally designated by the reference numeral 1, comprises at least one pump 2, which is connectable to at least one pipe 3, in which a liquid is intended to flow.

The pump 2 is actuated by at least one motor assembly 40 which comprises at least one electric motor 4 connected to the pump 2 through its output shaft 4*a*, in order to transmit a given rotation speed and a given mechanical torque to the pump 2.

The pump 2 can be, for example, a centrifugal pump, while the electric motor 4 can be, for example, constituted by a brushless motor (BLDC).

However, there is no reason why the pump 2 cannot be constituted by a different type of pump, such as for example a peristaltic pump or a volumetric pump, and there is no reason why the electric motor 4 cannot be constituted, in turn, by an induction motor or another type of electric motor.

Sensing means 5 are provided, which make it possible to measure at least two electrical parameters correlated with the operation of the electric motor 4, and processing means 6, conveniently constituted by a microprocessor, which are functionally connected to the sensing means 5 and are configured to determine, based on the signals provided by the sensing means 5, at least one fluid-dynamic parameter correlated with the flow of the liquid through the pipe 3 which it is desired to measure.

For example, the electrical parameters that can be measured by the sensing means 5 can comprise at least two electrical parameters chosen from the group that comprises: electric voltage V at the terminals of the electric motor 4, intensity I of the electric current absorbed by the electric motor 4 and, optionally, also the frequency fr of the electric current absorbed by the electric motor 4, while the fluid-dynamic parameter correlated with the flow of the liquid that can be obtained by the processing means 6 based on such electrical parameters can be the flow rate Q or the pressure p of the liquid in the pipe 3.

Conveniently, the processing means 6 are functionally connected to a memory unit 7, which stores at least one relational data set, i.e. data representing a respective relationship, per se conventional, between mechanical parameters correlated with the operation of the electric motor 4, such as, for example, the mechanical torque c and the rotation speed (vel) supplied by the electric motor 4 at its output shaft 4*a*, and at least one corresponding fluid-dynamic parameter correlated with the operation of the pump 2, such as the flow rate or the pressure or head, supplied to the liquid by that pump.

This relationship (usually referred to in the technical jargon as "characteristic curve of the pump") is defined uniquely for the pump 2 and can, for example, represent the link between the torque supplied by the motor 4, at a given rotation speed of the output shaft 4*a*, and the flow rate or pressure dispensed by the pump 2.

The memory unit 7 advantageously contains multiple data sets 8*a*-8*e* and 9*a*-9*e*, each one of which represents, for the pump 2 and a specific liquid, the relationship, at a corresponding rotation speed of the output shaft 4*a*, between the torque supplied by the electric motor 4 and a fluid-dynamic parameter correlated with the operation of that pump, such as the flow rate or the pressure.

In particular, the memory unit 7 can contain, for example, first data sets 8*a*-8*e*, each one of which represents, for the pump 2 and a specific liquid, a relationship, at a corresponding rotation speed of the output shaft 4*a*, between the torque supplied by the electric motor 4 and the flow rate supplied by the pump 2 to the liquid circulating in the pipe 3. Basically, the relationship represented by the first data sets 8*a*-8*e* can take a form of the type Q=f(vel, c).

The memory unit 7 can also contain second data sets 9*a*-9*e*, each one of which represents, for the pump 2 and a specific liquid, a relationship, at a corresponding rotation speed of the output shaft 4*a*, between the torque supplied by the electric motor 4 and the pressure supplied by the pump 2 to the liquid circulating in the pipe 3. Basically, the relationship represented by the second data sets 9*a*-9*e* can take a form of the type p=f(vel, c).

These data sets 8*a*-8*e*, 9*a*-9*e* constitute a mapping of the hydraulic characteristics of the pump 2 and are obtained experimentally.

In other words, the link between the fluid dynamic values of flow rate Q and pressure p supplied by the pump 2 and the mechanical values constituted by the mechanical torque c and by the rotation speed (vel) supplied to the pump 2 by the electric motor 4 are obtained through experimentation, with a two-dimensional mapping operation that entails subjecting the pump 2 (or, more precisely, a sample pump representing the type and the geometric and technical characteristics of the specific pump 2) to various different working conditions.

Basically, the two-dimensional mapping operation of the pump involves making the sample pump operate work at different values of the rotation speed of the output shaft 4*a* of the electric motor 4 and of the mechanical torque supplied by that electric motor, so as to be able to read, for each pair of values of the rotation speed of the output shaft 4*a* of the electric motor 4 and of the mechanical torque supplied by the electric motor 4, a corresponding value of the flow rate or of the pressure supplied by the sample pump to the liquid.

Figure 5:
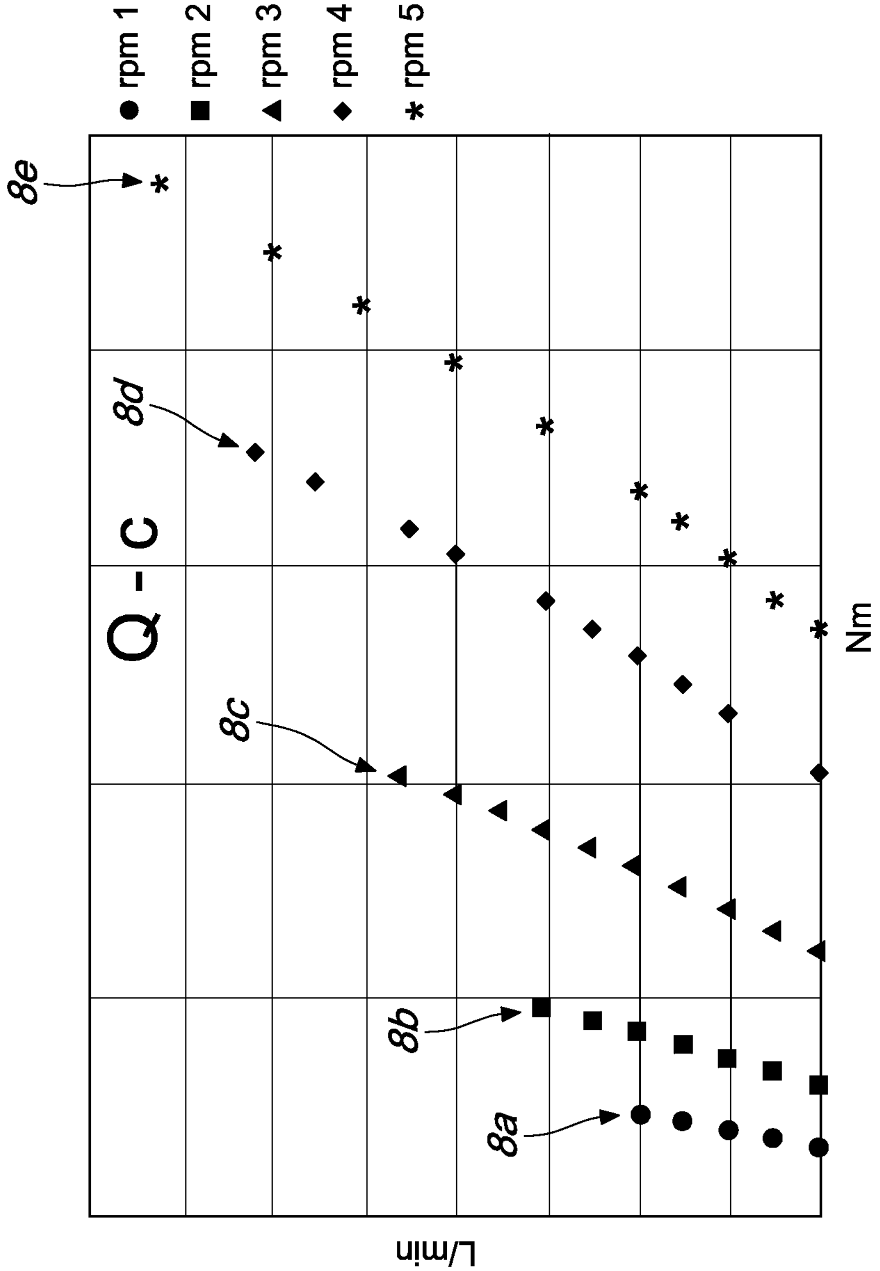
FIG. 5 is a graph of points representing the relationship between the mechanical torque supplied by the electric motor of the system according to the invention and the flow rate dispensed by the pump of the system according to the invention, at different rotation speeds of the output shaft of the electric motor.
Figure 6:
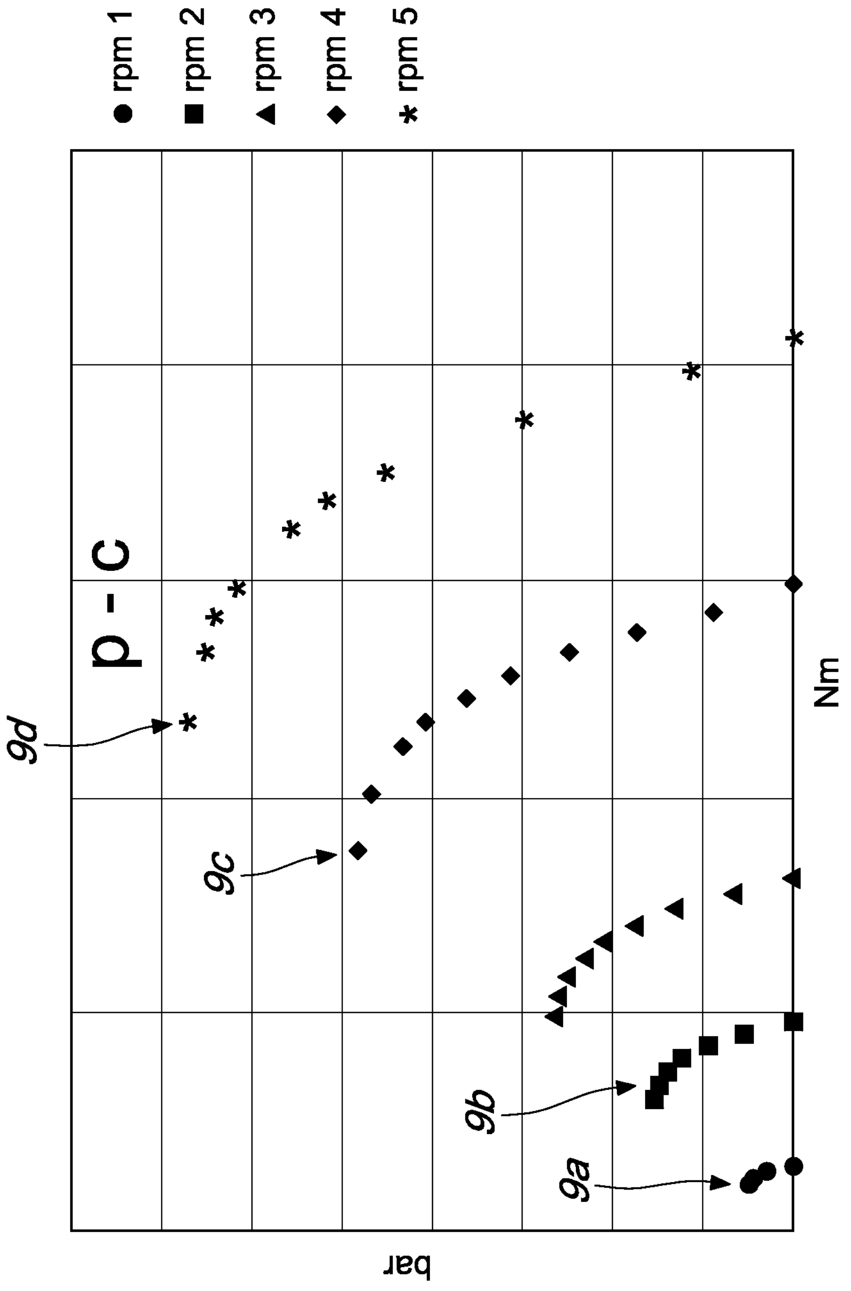
FIG. 6 is a graph of points representing the relationship between the mechanical torque of the electric motor of the system according to the invention and the pressure supplied by the pump of the system according to the invention, at different rotation speeds of the output shaft of the electric motor.

Each data set 8*a*-8*e*, 9*a*-9*e* can be represented graphically as a series of points on a Cartesian plane, which plots the relationship of the torque of the electric motor 4 with the flow rate or the pressure of the pump 2, as shown in FIGS. 5 and 6.

The continuous function passing through the points of each data set 8*a*-8*e*, 9*a*-9*e* can be calculated by approximation by the processing means 6 using mathematical operations, such as for example a piecewise linearization.

The mapping stored in the memory unit 7 can comprise data sets 8*a*-8*e*, 9*a*-9*e* corresponding to a discrete number of values of the rotation speed of the output shaft 4*a* of the electric motor 4.

The data sets corresponding to other values of the rotation speed of the output shaft 4*a* of the electric motor 4 that are not stored in the memory unit 7 can be calculated by the processing means 6, starting from at least two data sets 8*a*-8*e*, 9*a*-9*e* stored in the memory unit 7, for example by way of conventional mathematical operations to calculate the weighted average.

In more detail, the processing means 6 are advantageously configured to calculate, using mathematical equations that express relationships that are per se known, at least one mechanical parameter of operation of the electric motor 4, such as, for example, the torque supplied by the electric motor 4 at its output shaft 4*a* or the rotation speed of the output shaft 4*a* of the electric motor 4, based on the values measured by the sensing means 5, and they are also configured to determine, using the calculated mechanical parameter of operation of the motor 4 and the representative data of the data sets 8*a*-8*e*, 9*a*-9*e* stored in the memory unit 7, the fluid-dynamic parameter correlated with the flow of the liquid that it is desired to measure.

According to a practical embodiment, if, for example, the electric motor 4 is a conventional brushless motor and, in particular, a brushless motor that already has its own electronic control board 10 with a microprocessor, then the indirect measurements of torque and speed of the electric motor 4 derived from measuring the electrical parameters of operation of the electric motor, like the electric voltages and the intensity and frequency of the electric currents at the phases, can be supplied by the electronic control board 10 of the electric motor, which, as is known, is typically already programmed, using predefined conventional calculation algorithms, to be able to supply these measurements of the torque and speed of the motor using only electrical measurements and the plate data of that motor, if any. The electric motor 4 and the associated electronic board 10 together constitute the motor assembly 40 for actuating the pump 2, shown schematically in dotted lines in FIGS. 1-4.

The above-mentioned predefined calculation algorithms implement, basically, relationships that take the following general form: vel=$f_{vel}$(I, V) and c=$f_c$(I, V), where $f_{vel}$ indicates a relationship linking the value of speed to the electrical parameters of the pump, while $f_c$ indicates a relationship linking the value of torque to the electrical parameters.

Basically, these relationships can be implemented by library functions that supply the torque and speed values based on the electrical parameters at run-time, and which are already incorporated by the manufacturer in the electronic board 10 of the brushless motor.

For example, in order to obtain the values of torque and speed of the electric motor from the electrical parameters, the library functions named MC_GetMecSpeedAverageMotor1( ) and MC_GetTerefMotor1( ) can be used, which belong to the library supplied with the automatic code generation system named "ST Motor Control Workbench", in particular in the version named "5.Y.4", supplied by the microprocessor manufacturer named STMicroelectronics.

Other producers of microprocessors suitable for controlling brushless motors supply equivalent library functions.

According to this embodiment, the electronic board 10 already installed on the conventional brushless motor can be used to provide, using the microprocessor mounted on it, the processing means 6.

Furthermore, the electronic board 10 can have the sensing means 5 already mounted on it.

In this case, therefore, the electronic board 10 already installed on the brushless motor can be connected to a memory unit 7 containing data representing the existing relationship between mechanical parameters correlated with the operation of the electric motor 4 constituted by that brushless motor and fluid-dynamic parameters correlated with the operation of the pump 2, or such representative data can be loaded directly into the memory unit if it is already installed on the electronic board of the brushless motor.

Figure 7:
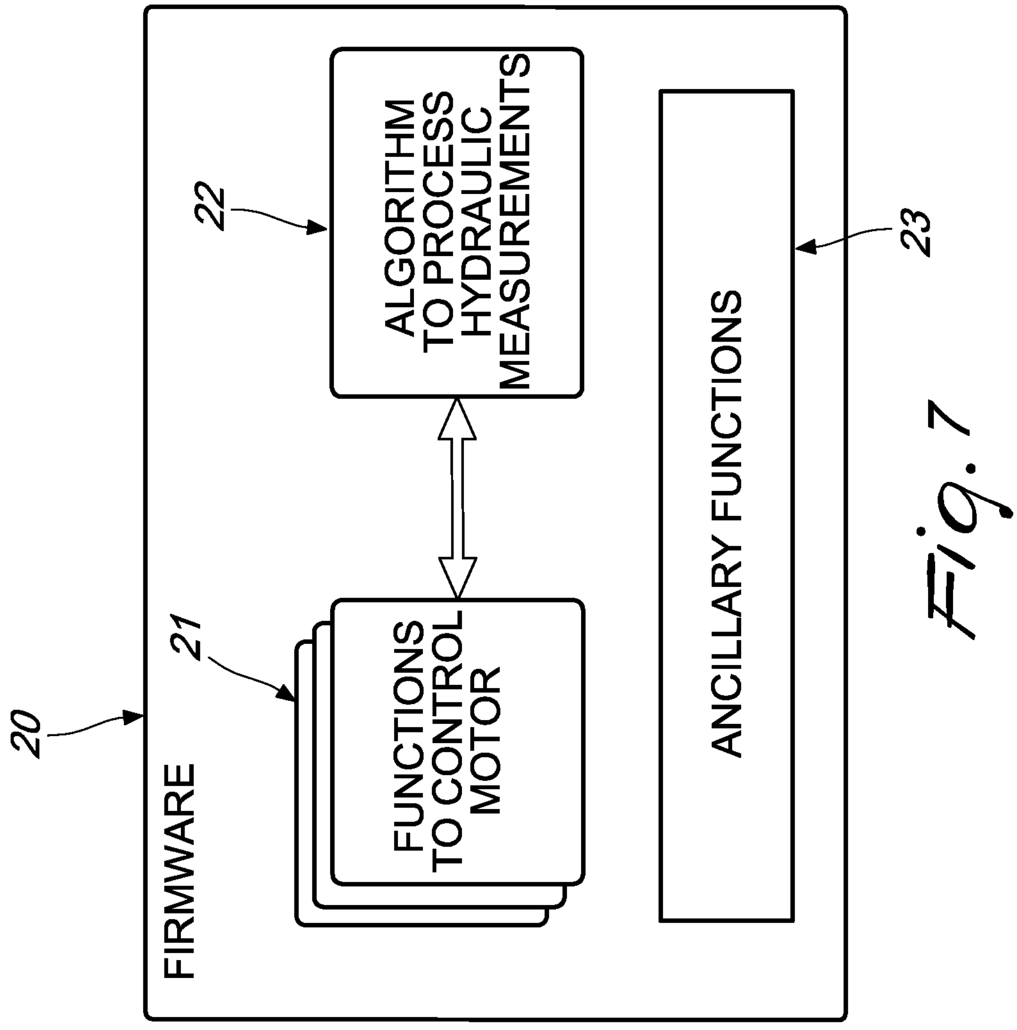
FIG. 7 is a schematic of the firmware installed in an electronic board associated with the electric motor of the system according to the invention.

Also in this case, as shown schematically in FIG. 7, the firmware 20 installed in the electronic board 10 of the brushless motor that implements the electric motor 4 can be implemented to comprise at least two software modules that interface with each other and, more specifically, at least one first module 21, containing functions to control the brushless motor, and at least one second module 22, in turn containing software based on a calculation algorithm that makes it possible to supply hydraulic measurements correlated with the operation of the pump 2. The firmware 20 can also comprise other ancillary functions 23.

In particular, the first module 21 can contain, for example, the functions that are typically present in the conventional types of firmware which are installed on the electronic boards of existing brushless motors.

More specifically, the functions contained in the first module 21 of the firmware are programmed to supply at least one mechanical parameter of operation of the electric motor 4 as a function of the values measured by the sensing means 5, by applying the known relationships that link electrical parameters of operation of the electric motor 4 to mechanical parameters of operation of the electric motor.

In turn, the calculation algorithm on which the software that implements the second module 22 of the firmware 20 is based comprises at least two functions, in particular an averaging function and a function to linearize the representative data contained in the memory unit 7.

More specifically, the averaging function makes it possible to build, starting from the data sets 8*a*-8*e*, 9*a*-9*e* stored in the memory unit 7, a series of values that represent, in a chart, a series of points that link, for example, torque values of the electric motor 4 and flow rate values of the pump 2, or torque values of the electric motor 4 and pressure values of the pump 4, to the current rotation speed value of the output shaft 4*a* of the electric motor 4, which is obtained by processing the values supplied by the sensing means 5.

As previously mentioned, the points of the series built are, in particular, calculated as a weighted average between points of two contiguous series of points i.e. as a weighted average of the values of two data sets 8*a*-8*e*, 9*a*-9*e* stored in the memory unit 7 and corresponding, respectively, to a speed value lower than and a speed value higher than the value of the rotation speed of the output shaft 4*a* of the electric motor 4 obtained by processing the values of the electrical parameters supplied by the sensing means 5.

The linearization function on the other hand supplies the mechanical torque/flow rate link or the mechanical torque/pressure link, by piecewise linearizing the values in the built series.

The calculation algorithm of the second module 22 is executed in run-time.

Advantageously, deviations in the measurements of flow rate/pressure owing to the dispersion of characteristics linked to the manufacturing tolerances of the pump 2, with respect to the pump taken as a sample in order to produce the representative data 8*a*-8*e*, 9*a*-9*e* stored in the memory unit 7, are compensated by at least one first correction coefficient, in particular a multiplicative coefficient $K_p$.

More specifically, such first correction coefficient $K_p$ is stored in the memory unit 7 and the processing means 6 are configured to determine the fluid-dynamic parameters correlated with the flow of the liquid, like flow rate and pressure, based also on the first correction coefficient $K_p$.

In particular, the processing means 6 multiply the first correction coefficient $K_p$ with the flow rate and pressure values obtained by those same processing means 6, following execution of the modules 21 and 22 of the firmware 20, i.e. following the calculation, by the processing means 6, of the values of the mechanical parameters of operation of the electric motor 4, which were previously calculated by the processing means 6 starting from the values of the electrical parameters of the pump 2 supplied by the sensing means 5, and of the representative data 8*a*-8*e*, 9*a*-9*e* stored in the memory unit 7.

It should be noted that the correction coefficient $K_p$ can be applied to every single pump on a production line. The value of the coefficient to be inserted derives from the ratio between the measurement obtained with $K_p=1$ and the value obtained using a reference instrument placed on the production line.

This method enables calibration of the mapping for all pumps produced.

Conveniently, temperature sensing means 15 are provided which are adapted to detect the temperature of use of the pump 2.

Temperature of use of the pump 2 means the temperature at which the pump 2 is called on to operate under specific conditions, and it can depend for example on the temperature of the liquid, on the ambient temperature, or on the temperature of the electric motor 4, if, in particular, the electric motor 4 is arranged adjacent to or in any case in the vicinity of the pump 2.

For example, such temperature sensing means 15 can be positioned in a region interposed between the pump 2 and the electric motor 4.

Advantageously, the processing means 6 are functionally connected to the temperature sensing means 15 and are, furthermore, configured to calculate, based on the signals originating from the temperature sensing means 15, a second correction coefficient, in particular a multiplicative coefficient $K_T$, and are configured to determine the fluid-dynamic parameters correlated with the flow of the liquid, based also on such second correction coefficient $K_T$.

In this manner, the deviation of the flow rate/pressure measurements owing to variations in temperature can be conveniently compensated at run-time by measuring that temperature by means of the sensor means 15.

Conveniently, the processing means 6 can be configured to apply both the first and the second correction coefficient.

Figure 4:
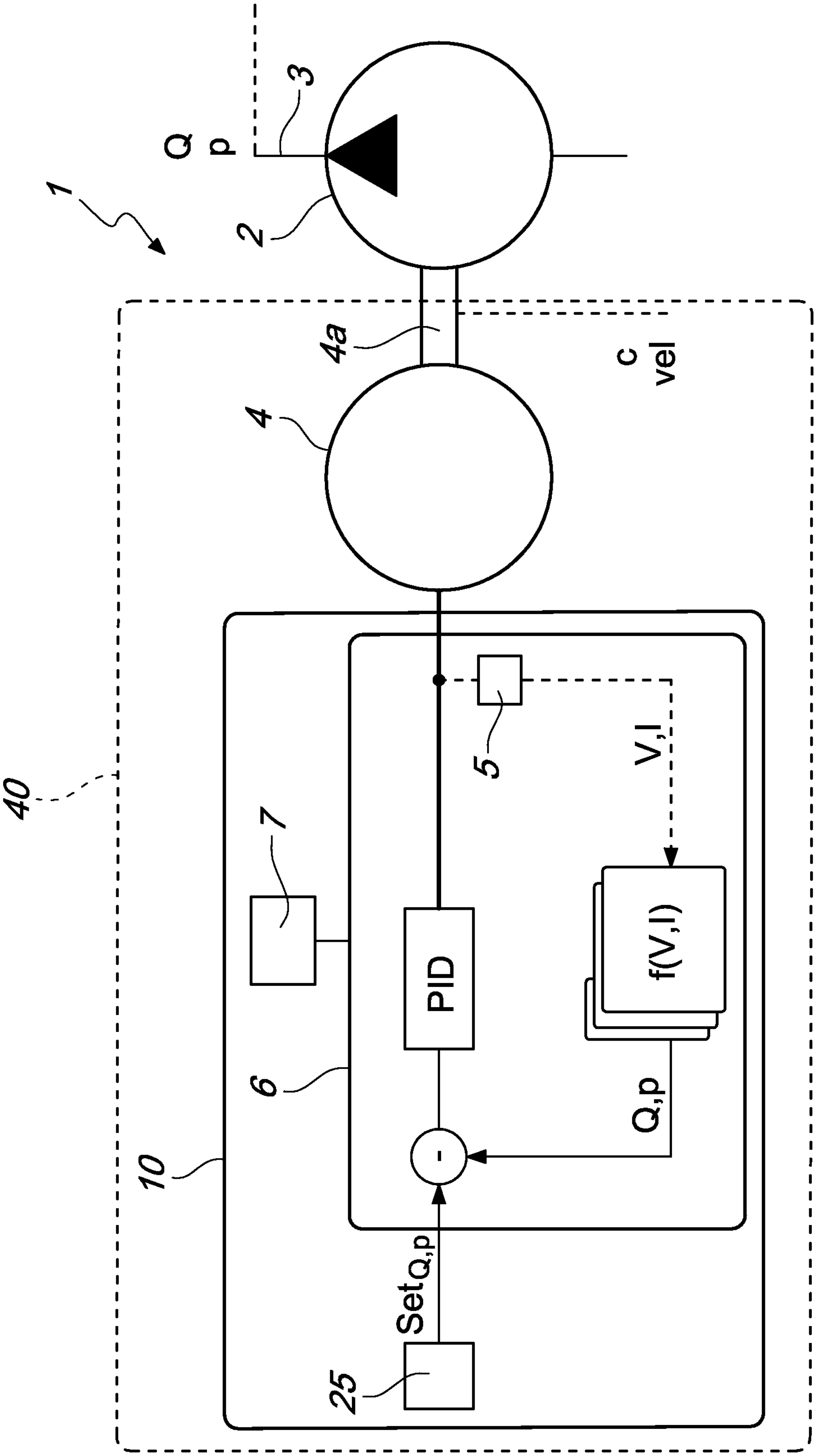
FIG. 4 is a schematic view of another embodiment of the system according to the invention, with the corresponding scheme of its operation.

Advantageously, as shown in FIG. 4, there can also be interface means 25 which enable the user to set at least one desired value for the fluid-dynamic parameters correlated with the flow of the liquid.

Such interface means 25 can be provided by a control panel, for example a touch-sensitive control panel, or by a keypad and a screen or other, similar devices.

Conveniently, the processing means 6 are functionally connected to the interface means 25 and are configured to execute a comparison between the desired value of the fluid-dynamic parameter correlated with the flow of the liquid, set by the user via the interface means 25, and the value of this fluid-dynamic parameter correlated with the flow of the liquid which is calculated by the processing means 6 based on the signals supplied by the sensing means 5.

The processing means 6 are further configured to drive the electric motor 4 based on the result of the above comparison.

Basically, the processing means 6 are, in this case, configured to act as a controller of the PID type, i.e. as a proportional-integral-derivative controller.

In particular, if the processing means 6 find a difference between the desired value and the calculated value of the fluid-dynamic parameter correlated with the flow of the liquid, then the processing means 6 will act on the electric motor 4 until such difference is canceled out, less a presettable tolerance margin.

The operation of the system, according to the invention, is the following.

The electric motor 4 is activated so as to drive the pump 2 and as a consequence obtain the flow of the liquid along the pipe 3.

At this point, the sensing means 5 detect at least two electrical parameters correlated with the operation of the electric motor 4, such as the electric voltage at the terminals or at the phases of the electric motor 4, the intensity and/or the frequency of the electric current that passes through the electric motor 4, and supply the sensed value of such electrical parameters correlated with the operation of the electric motor 4 to the processing means 6.

The processing means 6, once the sensed value has been received from the sensing means 5 that detected the above-mentioned electrical parameters, are capable of processing such sensed values of the electrical parameters so as to provide the value of at least one fluid-dynamic parameter correlated with the flow of the liquid through the pipe.

In particular, the processing means 6 first proceed to determine, based on the sensed values of the electrical parameters supplied by the sensing means 5, the value of at least one mechanical parameter correlated with the operation of the electric motor 4, such as for example the torque dispensed by the electric motor 4 or the rotation speed of the output shaft of the electric motor 4, by executing, for example, the functions contained in the first module 21 of the firmware 20.

Subsequently, the processing means 6 proceed to determine the value of the fluid-dynamic parameter correlated with the flow of the liquid, based on the value of the mechanical parameter correlated with the operation of the electric motor 4 that was determined previously.

To do this, the processing means 6 conveniently execute the functions of the second module 22 of the firmware 20 and insert the value of the mechanical parameter into the relationships represented by the data sets ***8a*-*8e*, *9a*:*9e* stored in the memory unit 7**.

In particular, if the value of the rotation speed of the output shaft *4a* of the electric motor 4 determined previously by the processing means 6 does not correspond to the values of the rotation speed of the output shaft *4a* of the electric motor 4 of the representative data sets ***8a*-*8e*, *9a*-*9e* stored in the memory unit 7, then the processing means 6 will first calculate, via weighted average operations performed on the data sets *8a*-*8e*, *9a*-*9e* stored in the memory unit 7, a new data series corresponding to points on a curve that represents, for the value of the rotation speed of the output shaft *4a* of the electric motor 4 determined by the processing means 6, the relationship between a mechanical parameter correlated with the operation of the electric motor 4, such as for example the torque dispensed by the electric motor 4, and a determined fluid-dynamic parameter correlated with the operation of the pump 2**, such as, for example, the pressure or the flow rate.

The processing means 6 will then determine, via piecewise linearization operations, the linear approximation of the continuous mathematical function that passes through the points corresponding to the new data series that was calculated previously.

At this point, the processing means 6 calculate, using the linear approximation obtained, the desired value of the fluid-dynamic parameter based on the values that were previously determined of the mechanical parameters correlated with the operation of the electric motor 4.

The processing means 6 can subsequently apply the first correction coefficient $K_p$ to this obtained desired value of the fluid-dynamic parameter, via a mathematical operation of multiplication, in order to take account of the manufacturing tolerances of the pump 2.

The processing means 6 also calculate, via the measurement of the temperature supplied by the temperature sensing means 15, the second correction coefficient $K_T$ which will then be to the determined value of the fluid-dynamic parameter correlated with the flow of the liquid, again via a mathematical operation of multiplication, so obtaining the final value of the fluid-dynamic parameter correlated with the flow of the liquid, which can be sent by the processing means 6 to the interface means 25, so that it can be viewed by the user.

If the user has set, via the interface means 25, a desired value for the fluid-dynamic parameter correlated with the flow of the liquid, then the processing means 6 will compare this desired value with the value of the same fluid-dynamic parameter that was determined by the processing means 6 by way of the detections performed by the sensing means 5.

If the processing means 6 find a difference in the comparison between the desired value and the determined value of the fluid-dynamic parameter that is greater than a preset tolerance limit, the processing means 6 will vary the operation of the pump 2 in feedback, by acting on the electrical parameters of the electric motor 4, so as to vary the mechanical parameters correlated with the operation of the electric motor, until the detected difference is canceled out, less a presettable tolerance margin.

In practice it has been found that the invention fully achieves the intended aim and objects, and in particular it is emphasized that the system according to the invention makes possible the measurement and adjustment of the flow rate and/or of the pressure in a plumbing system, without using sensors to measure the flow rate and the pressure.

The invention, thus conceived, is susceptible of numerous modifications and variations, all of which are within the scope of the appended claims. Moreover, all the details may be substituted by other, technically equivalent elements.

In practice, the materials used, as well as the contingent shapes and dimensions, may be any according to the requirements and to the state of the art.

The disclosures in Italian Patent Application No. 102023000000267 from which this application claims priority are incorporated herein by reference.

What is claimed is:

1. A system for circulating a liquid, which comprises at least one pump, connectable to at least one pipe for a flow of a liquid, and at least one motor assembly, said motor assembly comprising:

at least one electric motor—for driving said pump;

sensing means of at least two electrical parameters correlated with operation of said electric motor;

processing means functionally connected to said sensing means and configured to determine, based on signals provided by said sensing means, at least one fluid-dynamic parameter correlated with the flow of said liquid through said pipe;

a memory unit containing at least one data set representing a respective relationship between mechanical parameters correlated with the operation of said electric motor and at least one corresponding fluid-dynamic parameter correlated with an operation of said pump;

an electronic board having mounted thereon said sensing means, said processing means and said memory unit;

a firmware installed in the electronic board that implements said electric motor, said firmware comprising at least two software modules that interface with each other and comprising at least one first module, containing functions to control the electric motor, and at least one second module, in turn containing software based on a calculation algorithm that makes it possible to supply hydraulic measurements correlated with the operation of said pump;

said processing means being configured to calculate, as a function of values measured by said sensing means, at least one mechanical parameter of operation of said electric motor and to determine, by means of said calculated mechanical parameter of operation of said electric motor and said representative data, said at least one fluid-dynamic parameter correlated with the flow of said liquid;

said electric motor being a brushless motor.

2. The system according to claim 1, wherein said memory unit contains at least one first correction coefficient, said processing means being configured to use said first correction coefficient to help determine said at least one fluid-dynamic parameter correlated with the flow of said liquid, in order to compensate for errors resulting from manufacturing tolerances of said pump.

3. The system according to claim 2, further comprising temperature sensing means adapted to sense a temperature of use of said pump, said processing means being functionally connected to said temperature sensing means and being configured to calculate, based on signals that arrive from said temperature sensing means, a second correction coefficient and to use said second correction coefficient to help determine said at least one fluid-dynamic parameter correlated with the flow of said liquid.

4. The system according to claim 1, further comprising interface means for the user to set at least one desired value for said at least one fluid-dynamic parameter correlated with the flow of said liquid, said processing means being functionally connected to said interface means and being configured to perform a comparison between a desired value of said at least one fluid-dynamic parameter correlated with the flow of said liquid set by the user via said interface means and a value of said at least one fluid-dynamic parameter correlated with the flow of said liquid determined by said processing means based on the signals provided by said sensing means, said processing means being configured to drive said electric motor based on a result of said comparison.

5. The system according to claim 1, wherein said pump is a centrifugal pump.

6. A method for operating the system for circulating the liquid according to claim 1, which comprises a step of driving said pump by means of said electric motor in order to make said liquid flow through said pipe, and further comprising the steps of sensing said at least two electrical parameters correlated with the operation of said electric motor and of determining, based on a sensed value of said at least two electrical parameters, a value of at least one fluid-dynamic parameter correlated with the flow of said liquid through said pipe.

7. The method according to claim 6, further comprising a step of determining, based on the sensed value of said at least two electrical parameters correlated with the operation of said electric motor, the value of at least one mechanical parameter correlated with the operation of said electric motor and a step of determining a value of said at least one fluid-dynamic parameter correlated with the flow of said liquid based on the previously-determined value of said at least one mechanical parameter correlated with operation of said electric motor and based on said at least one data set representing a respective relationship between mechanical parameters correlated with the operation of said electric motor and at least one corresponding fluid-dynamic parameter correlated with operation of said pump.

8. The method according to claim 6, comprising the step of applying a first correction coefficient to the determined value of said at least one fluid-dynamic parameter correlated with the flow of said liquid, in order to take into account manufacturing tolerances of said pump.

9. The method according to claim 8, further comprising the steps of sensing a temperature of use of said pump, of calculating, depending on said temperature of use, a second correction coefficient, and of applying said second correction coefficient to the determined value of said at least one fluid-dynamic parameter correlated with the flow of said liquid.

10. The method according to claim 6 further comprising the steps of setting a desired value for said at least one fluid-dynamic parameter correlated with the flow of said liquid, of comparing the desired value of said at least one fluid-dynamic parameter correlated with the flow of said liquid with a value of at least one fluid-dynamic parameter correlated with the flow of said liquid determined based on the sensed value of said at least two electrical parameters, and of varying said operation of said pump based on a result of said comparison step.

* * * * *